UNITED STATES PATENT OFFICE.

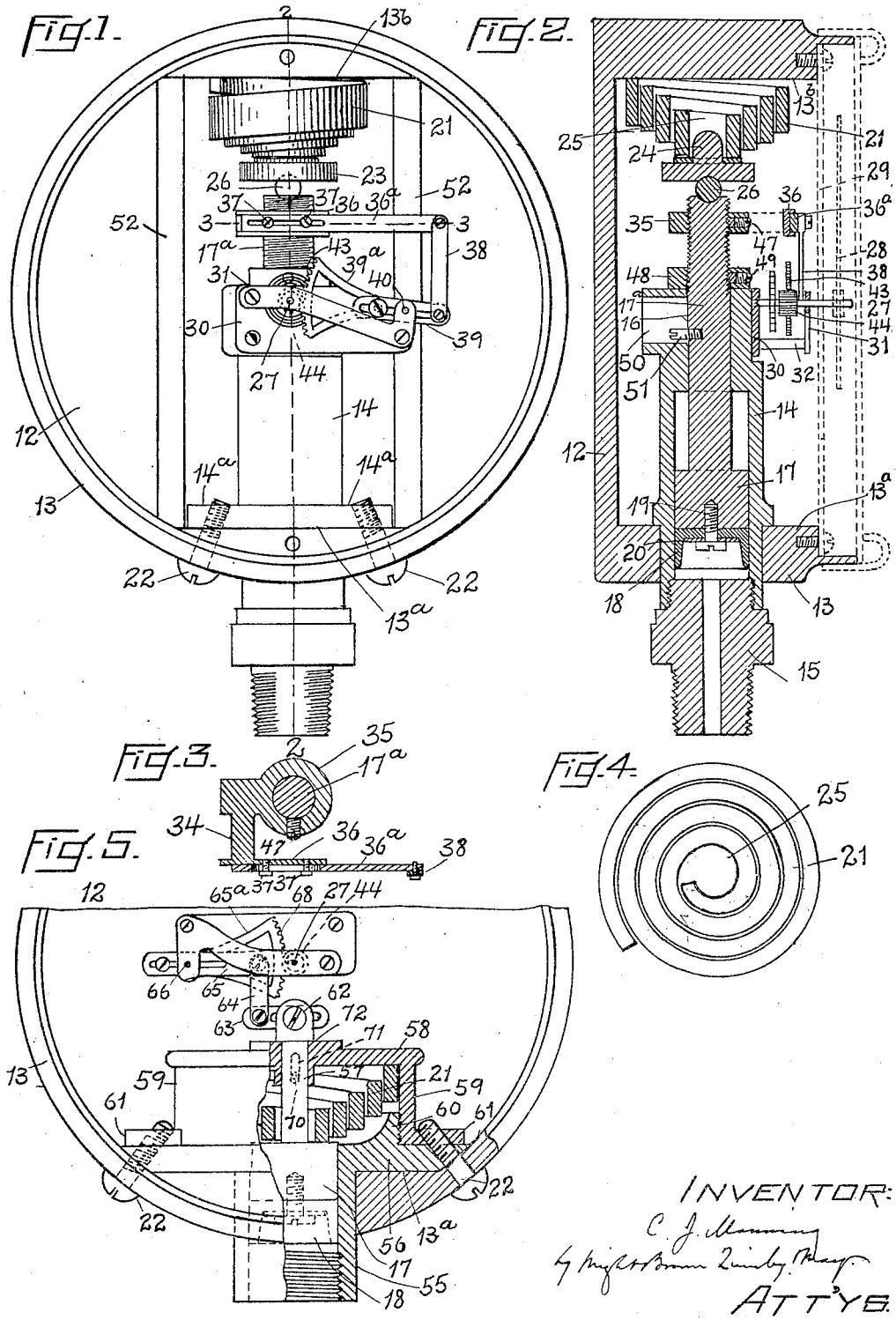

COLEMAN J. MANNING, OF MEDFORD, MASSACHUSETTS.

PRESSURE-GAGE.

1,346,604.      Specification of Letters Patent.     Patented July 13, 1920.

Application filed May 8, 1919. Serial No. 295,674.

*To all whom it may concern:*

Be it known that I, COLEMAN J. MANNING, a citizen of the United States, residing at Medford, in the county of Middlesex and State of Massachusetts, have invented new and useful Improvements in Pressure-Gages, of which the following is a specification.

This invention relates particularly to a pressure gage the registering mechanism of which includes a pointer carrying arbor, and torque-transmitting connections between said arbor and the means directly actuated and moved by variations of pressure, said connections including small toothed gear members such as a pinion on the arbor, and a toothed sector meshing with said pinion.

Heretofore the nature of the said directly actuated means has been such that when the gage is employed to indicate variations of liquid pressure, or is, in other words, a hydraulic gage, the arbor, the gear teeth, and other relatively delicate parts of the registering mechanism are subjected to injurious wear and strain by vibrations attending the ordinary operation of the gage, and that the pointer carried by the arbor fluctuates or oscillates undesirably before coming to rest.

My invention has for its object to provide a gage adapted especially to indicate variations of liquid pressure, and free from the objections above stated.

To this end I employ as the means directly acted on by the medium whose variations of pressure are indicated, a piston which is movable in one direction by increments of pressure, and in the opposite direction by a spring, the piston being connected by torque-transmitting means with the pointer-carrying arbor, and operating the latter and the pointer without objectionable vibration.

Of the accompanying drawings forming a part of this specification,—

Figure 1 is a front elevation of a pressure gage embodying the invention, the dial and pointer being removed.

Fig. 2 is a section on line 2—2 of Fig. 1, the dial and pointer being shown by dotted lines.

Fig. 3 is a section on line 3—3 of Fig. 1.

Fig. 4 is a plan view of the spring shown by Figs. 1 and 2.

Fig. 5 is a front elevation, partly in section, of a pressure gage constituting another embodiment of the invention.

The same reference characters indicate the same parts in all of the figures.

The casing of the gage as here shown includes a back 12 and a circular wall 13. 14 represents a cylinder fixed to, and extending through the casing wall, and provided at one end with means such as an externally threaded nipple 15, for connection with a liquid conduit, and reduced at its opposite end to form a guide 16. The cylinder is preferably secured to the casing by screws 22 passing through the casing wall 13, a cylinder seat $13^a$ forming a part of said wall, and ears $14^a$ formed on the cylinder. 17 represents a piston having a close sliding fit in the cylinder and adapted to be moved therein in one direction by pressure of liquid in the cylinder, the piston being preferably provided with a cup washer 18, of leather or other suitable material, secured by a screw 19 and a washer 20, and having a liquid-tight sliding fit on the interior of the cylinder. An important function of the cup washer 18 will be stated hereinafter.

A reduced portion $17^a$ of the piston is adapted to slide in the guide 16, and projects therefrom as shown by Fig. 2. 21 represents a spring which is preferably of volute form, and is seated on a spring abutment $13^b$ forming a part of the casing wall and located at the side thereof opposite the seat $13^a$.

The spring 21 is adapted to move the piston 17 in a direction opposite to that in which the piston is moved by liquid pressure. The spring acts on the piston preferably through a flexible pressure-transmitting means, embodied in a head or disk 23 having a stud 24 loosely entering a socket 25 formed by the inner convolution of the spring, and a ball 26 interposed between the head 23 and the outer end of the piston, the said head and ball being preferably made of hardened steel.

27 represents the arbor which carries the usual pointer 28, the latter and the usual dial 29, being omitted from Fig. 1 and shown by dotted lines in Fig. 2.

The arbor is journaled in bearings in a fixed frame which, as here shown, includes a plate 30 attached to the cylinder 14, and a plate 31 attached to the plate 30 by studs, one of which is shown at 32, in Fig. 2.

Torque is transmitted from the piston to the arbor by suitable connections, which may include a stud 34 (Fig. 3) on a collar 35 attached to the piston, an arm composed of a member 36 fixed to the stud 34, and a slotted member 36a secured by screws 37 to the member 36, a link 38 pivoted to the arm member 36a, a lever composed of a slotted member 39, and a member 39a secured by a screw to the member 39, said lever being fulcrumed at 40 on the frame above described, and pivoted to the link 38, a gear-toothed segment 43 formed on the member 39a, and a pinion 44 fixed to the arbor 27.

It will now be seen that the piston is movable in one direction by liquid pressure in the cylinder, and in the opposite direction by the spring, and that the movements of the piston cause rotary movements of the arbor 27, and swinging movements of the pointer 28.

I have found by practical use of the gage that the movements of the piston are not jerky or spasmodic, and do not cause undue wear of the more delicate members of the torque-transmitting mechanism, and of the arbor, and that the pointer comes quickly to rest after each change of position. This is due to the fact that the cup washer 18, moving with the piston and in frictional contact with the wall of the cylinder, constitutes a frictional retarding member which prevents spasmodic or jerky movements of the piston and of the pointer, and causes the latter to come quickly to rest.

The portion 17a of the piston is preferably screw-threaded above the guide 16, and the collar 35 is internally threaded to engage the thread on the piston, provision being thus made for adjusting the collar and the arm supported thereby. The collar may be locked at any desired adjustment by a set screw 47.

The piston is provided with a stop collar 48, which may be a nut engaged with the thread on the piston and arranged to abut against the cylinder and limit the movement of the piston by the spring. The collar or nut 48 may be locked by a set screw 49.

To prevent the piston from turning in the cylinder, I provide the cylinder with a slot 50 receiving a stud 51 projecting from the piston.

The back 12 of the casing is preferably reinforced by ribs 52, extending from the ends of the spring abutment 13b to the ends of the cylinder seat 13a, said ribs preventing distortion of the casing by the pressure exerted on the seat and the spring abutment.

Referring to Fig. 5, which shows a simplified embodiment of the invention, 55 represents the cylinder, which is provided with a head or flange 56, bearing on the seat 13a, and secured by the screws 22. The piston 17 having the cup washer 18 is provided with a rod 57 which slides in a guiding orifice in the spring abutment 58. Said abutment is provided with an annular flange 59 which is internally threaded to engage an external thread on an annular shoulder 60 formed on the head 56, and may be provided with tapped ears 61 engaged by the screws 22. The volute spring 21, seated on said abutment, bears directly on the piston. To the piston rod 57 is attached by a screw 62 a slotted arm 63, connected by a link 64 with a slotted lever member 65, which is fulcrumed at 66 on a frame attached to the back 12 of the casing. A lever member 65a is adjustably fixed to the member 65 and is provided with a toothed sector 68 meshing with the pinion 44 on the pointer arbor 27.

The piston rod is prevented from turning in the guiding orifice in the abutment, by a pin 70 on the rod and a slot 71 in the abutment. The piston rod is provided with a stop shoulder 72, limiting the movement of the piston by the spring.

I do not limit myself to the employment of a volute spring, nor to either of the relative arrangements of the spring, the spring abutment and the piston shown by the drawings.

It will be seen that the cup washer 18 constitutes an expansible frictional retarding member secured to and movable with the piston and adapted to be expanded and held in frictional contact with the internal surface of the cylinder 14 by fluid pressure at the inlet end of the cylinder, so that in case there is a sudden and abruptly terminating increase of pressure at the inlet end of the cylinder, the piston stops simultaneously with the termination of the increase of pressure. There is, therefore, no lost motion of the piston, the pointer, and the connections between the piston and the pointer, and no fluctuation of the pointer causing delay in reading the registration. Moreover, there is no such wear on the connections between the pointer and the piston as would be caused by lost motion.

The gage is particularly adapted for use in indicating wide ranges of pressure on a body of liquid communicating with the cylinder 14. The pointer comes to rest instantly when the pressure ceases to vary so that no time is lost in reading the gage.

I claim:

1. A pressure gage comprising a casing, a cylinder fixed to and inclosed in the casing and having an inlet at one end projecting from the casing, a piston movable in one direction in the cylinder by fluid pressure, a spring seated on a fixed abutment in the casing and adapted to move the piston in the opposite direction, registering means including a revoluble pointer, connections between said pointer and the piston whereby the pointer is moved by a movement of the piston in either direction, and an expansible frictional retarding member secured to and movable with the piston and exposed to contact with fluid entering the cylinder, said member being adapted to be expanded and held in frictional contact with the internal surface of the cylinder by fluid pressure at the inlet end of the cylinder, whereby lost motion of the piston, the pointer, and the connections between the piston and the pointer is prevented, stop means being provided for limiting the movement of the piston by the spring and causing the spring to normally hold the pointer at its starting point.

2. A pressure gage comprising a casing, a cylinder fixed to the casing and having an enlargement at its inner end, a piston movable in one direction in the cylinder by fluid pressure, a spring abutment having an annular flange fixed to said enlargement, and a piston guide, a spring seated on the abutment and bearing directly on the piston, the spring being adapted to move the piston in the opposite direction, and registering mechanism operable by the piston, and a frictional retarding member movable with the piston, and in frictional contact with the cylinder, whereby vibration of the registering mechanism is prevented.

In testimony whereof I have affixed my signature.

COLEMAN J. MANNING.